United States Patent [19]

Masubuchi

[11] Patent Number: 4,947,365

[45] Date of Patent: Aug. 7, 1990

[54] NETWORK PATH TRACE APPARATUS AND NETWORK PATH TRACE METHOD

[75] Inventor: Yoshio Masubuchi, Kawasaki, Japan

[73] Assignee: Kabushiki Kaisha Toshiba, Kawasaki, Japan

[21] Appl. No.: 222,255

[22] Filed: Jul. 21, 1988

[30] Foreign Application Priority Data

Jul. 23, 1987 [JP] Japan .................. 62-184105

[51] Int. Cl.⁵ .............................. G06F 13/00
[52] U.S. Cl. .................... 364/900; 364/946; 364/940.68
[58] Field of Search ... 364/200 MS File, 900 MS File

[56] References Cited

U.S. PATENT DOCUMENTS 4,493,027 1/1985 Katz et al. .................. 364/200

OTHER PUBLICATIONS

15th Design Automation Conference "Design Verification and Performance Analysis", Marvin A. Wold, 1978, Honeywell Information System, Arizona.

Primary Examiner—Thomas M. Heckler
Attorney, Agent, or Firm—Oblon, Spivak, McClelland, Maier & Neustadt

[57] ABSTRACT

A path trace apparatus according to this invention for tracing path having specified start, middle and end points in a network comprises means for tracing a path in a forward direction from the middle point to the end point based on data representing the coupling relationship between elements constituting the network, and means for tracing a path in a reverse direction from the middle point to the start point based on the data. In tracing a path in a network by specifying three points, signal paths are traced in the forward and reverse directions with the middle point as the center, thus eliminating the wasteful tracing of paths which do not pass the middle point and thereby significantly increasing the tracing efficiency.

8 Claims, 8 Drawing Sheets

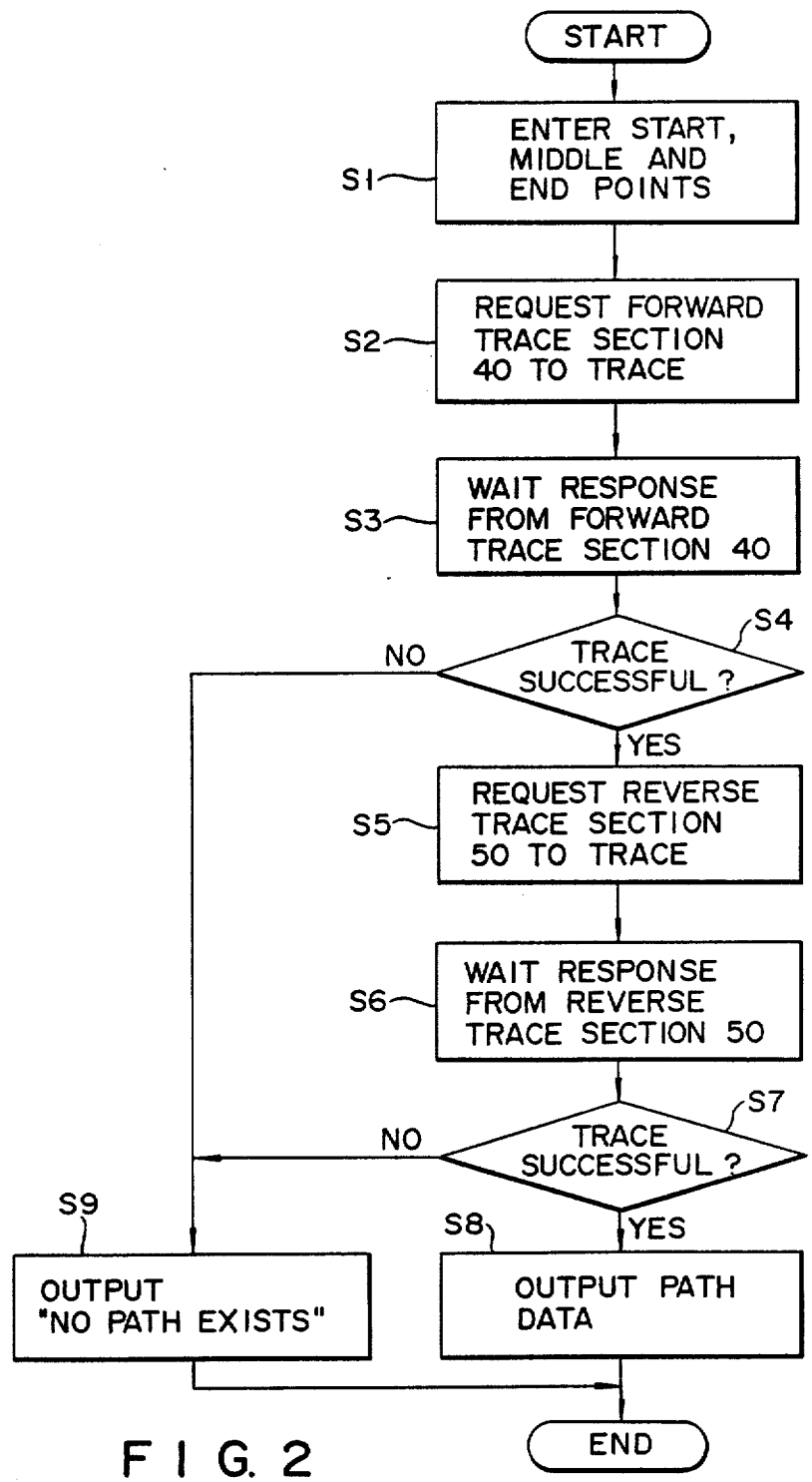
F I G. 2

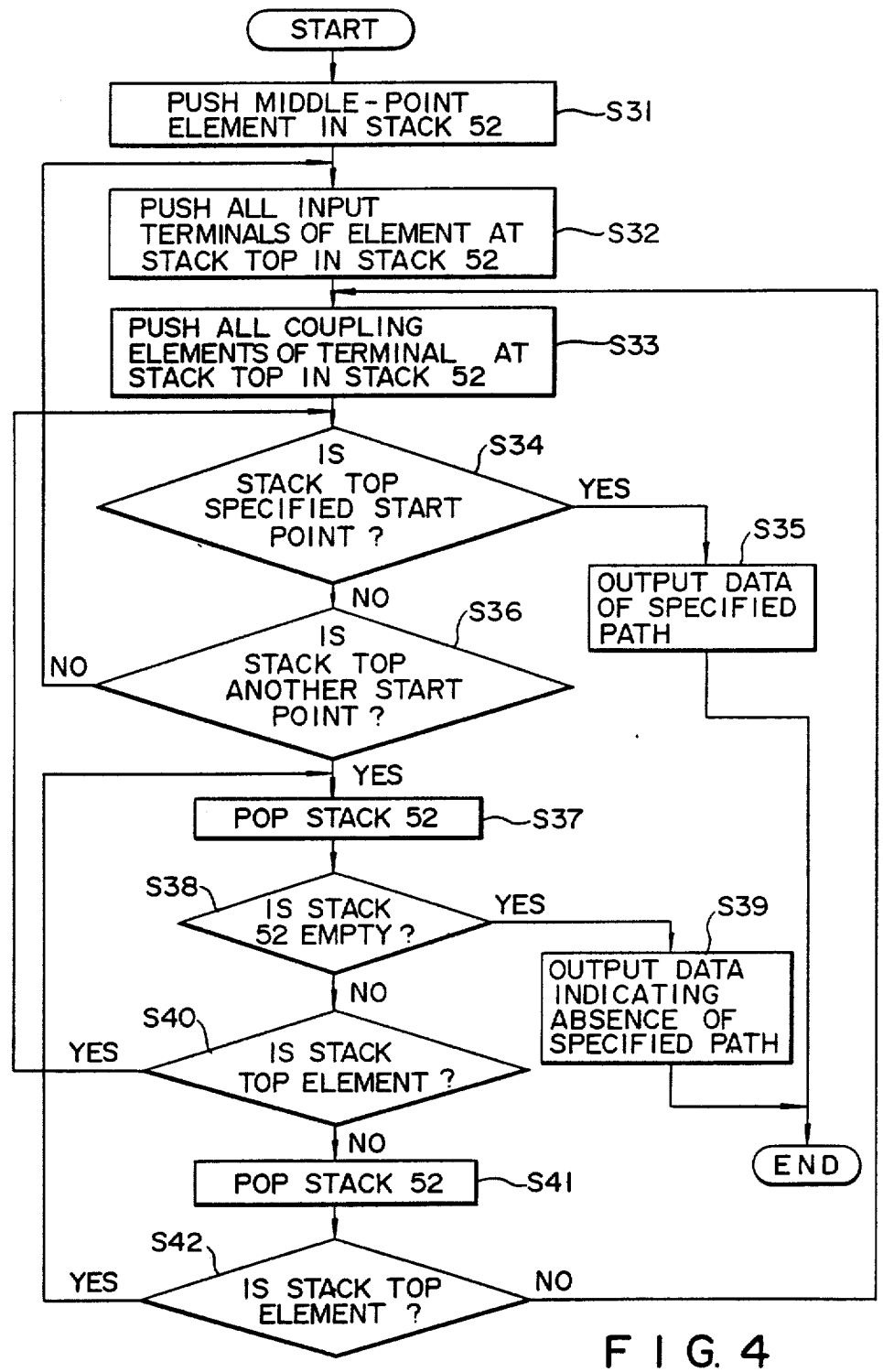
F I G. 4

| ELEMENT NO. | ELEMENT TYPE | TERMINAL | | CONNECTION |
|---|---|---|---|---|
| | | INPUT | OUTPUT | |
| E1 | INPUT TERMINAL | | | E2.A2 |
| E2 | BUFFER | A2 | | E1 |
| | | | Z2 | E3.A3 |
| E3 | INVERTER | A3 | | E2.Z2 |
| | | | Z3 | E4.CK4 |
| E4 | FLIP-FLOP | D4 | | ----- |
| | | CK4 | | E3.Z3 |
| | | | Q4 | E5.B5, E6.A6 |
| | | | $\overline{Q4}$ | ----- |
| E5 | OR GATE | A5 | | ----- |
| | | B5 | | E4.Q4 |
| | | | Z5 | E7 |
| E6 | AND GATE | A6 | | E4.Q4 |
| | | B6 | | ----- |
| | | | Z6 | E8.D8 |
| E7 | OUTPUT TERMINAL | | | E5.Z5 |
| E8 | FLIP-FLOP | D8 | | E6.Z6 |
| | | CK8 | | ----- |

FIG. 6

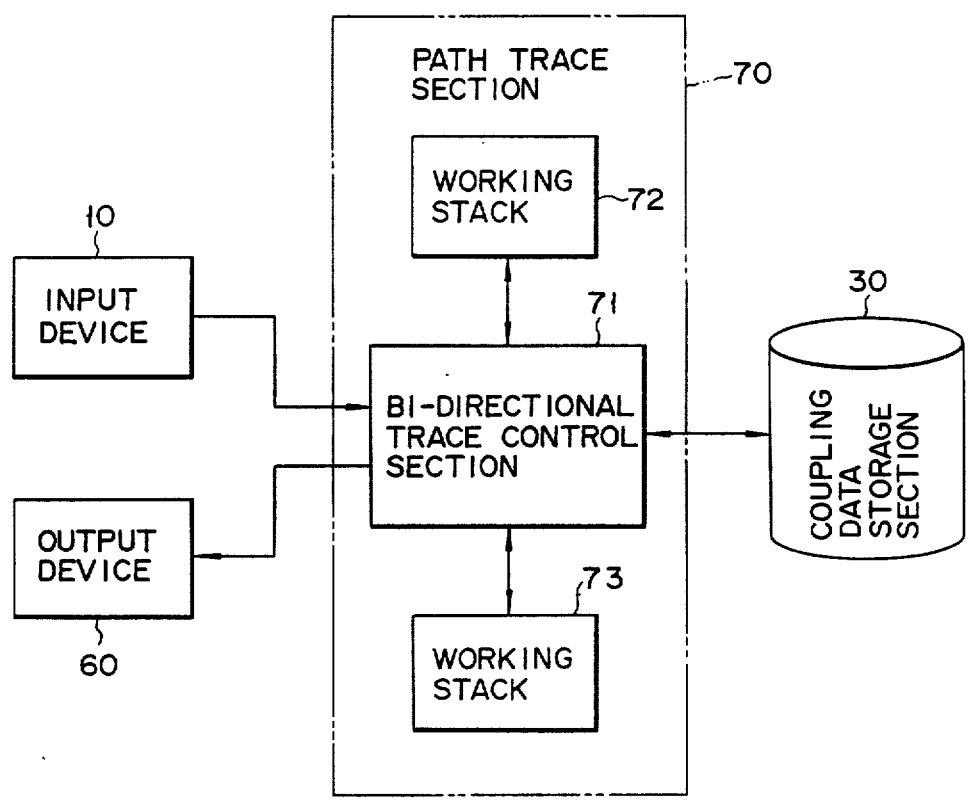
F I G. 9

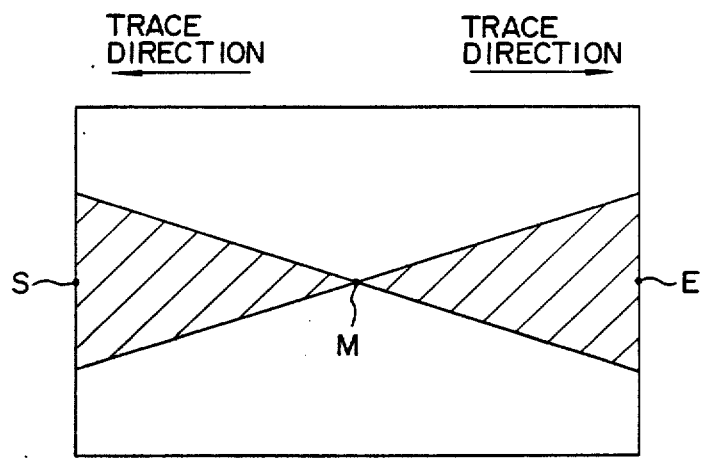
F I G. 10

NETWORK PATH TRACE APPARATUS AND NETWORK PATH TRACE METHOD

BACKGROUND OF THE INVENTION

1. Field of the Invention

The present invention relates to a network path trace apparatus and a network path trace method, and, more particularly, to a network path trace apparatus and a network path trace method which specify the start, middle and end points of a path to be traced to thereby trace the path that extends from the specified start point, through the middle point, to the end point.

2. Description of the Related Art

In designing a digital logic circuit, it is typical practice to extract a signal path connecting two specific points in the circuit and to then make various considerations to the path. For instance, the circuit design requires that a delay of a signal from one point to another point in the circuit be obtained and is verified if it satisfies control conditions of the circuit. The normal operation of the designed logic circuit is thereby ensured. These are very important workings in designing circuits. The verification is executed by extracting a signal path between two points and computing a delay time of a signal along the path.

Large scaling and complication of logic circuits has led to automation of the logic circuit design and has propelled automation of the aforementioned verification. Accordingly, various algorithms are proposed to extract a signal path to be verified from the data of a designed logic circuit (refer, for example, to 15th Design Automation Conference "Design Verification and Performance Analysis"; M, A. Wold; 1978). The extraction of the signal path in these algorithms is achieved by performing a trace process between the specified start and end points based on the mutual coupling relationship of constituent elements of the designed circuit.

Another verification for signal paths may require a middle point of a signal path to be specified in addition to the two (start and end) points required for extracting the path. For instance, in checking whether or not the individual flip-flops in a clock synchronizing type logic circuit satisfy the set up time and hold time conditions, it is necessary to compute the signal propagation delay time of a signal path which extends from a clock signal input terminal of the circuit through one flip-flop A to another flip-flop B. In this case, the start, middle and end points are specified as the clock signal input terminal of the circuit, flip-flop A, and flip-flop B, respectively.

When the start, middle and end points are specified, if the signal path from the start point to the end point is traced in the conventional manner, as shown in FIG. 11, it is not possible to know whether or not the middle point M is passed until the trace starting at start points, reaches the end where the end point E exists. Therefore, trace time would be spent on those many paths among the paths extending from the start point S to the end of the circuit that do not pass the middle point M, thereby deteriorating the tracing efficiency. Particularly with the clock signal input terminal being the start point as per the above example, there are a significant number of coupling destinations, thus the time required for wasteful tracing is increased accordingly. Further, since there are a significant number of combinations in which a flip-flop both serves a the middle point and the end point, the difficulty in tracing the paths for all the combinations and computing the delay time is increased. Furthermore, with the above trace method, the number of branches to be traced increases as the depth of the tracing becomes deeper, as shown in FIG. 11, so that the number of paths to be checked is significantly increased. Therefore, there would be considerable time spent tracing in the case where three points are specified, as per the case where two points are specified.

SUMMARY OF THE INVENTION

It is an object of this invention to provide a path trace apparatus which can efficiently trace a path passing specified start, middle and end points in a network and which can complete the tracing in a shorter period time.

It is another object of this invention to provide a more efficient trace method for tracing a path passing specified start, middle and end points.

According to one aspect of this invention, there is provided a path trace apparatus, which comprises:

coupling data storage means for storing data representing a coupling relationship between elements constituting a network;

path specifying means for entering data for specifying start, middle and end points of a path to be traced;

forward trace means for tracing in the forward direction a path coupling two arbitrary elements in the network;

reverse trace means for tracing in the reverse direction a path coupling two arbitrary elements in the network;

main control means for controlling the forward trace means and the reverse trace means in such a way as to cause the forward trace means to trace a path in the network coupling the middle and end points, and to cause the reverse trace means to trace a path in the network coupling the middle and start points; and means for outputting a path traced under a control of the main control means.

According to another aspect of this invention, there is provided a path trace method for tracing a path having specified start, middle and end points in a network based on data representing a coupling relationship between constituent elements of the network, which comprises steps of:

entering data for specifying start, middle and end points of a path to be traced;

tracing a path in the network coupling specified middle and end points in a forward direction from the middle point to the end point;

tracing a path in the network coupling specified middle and start points in a reverse direction from the middle point to the start point; and outputting paths traced by the forward and reverse tracing steps.

According to this invention, the forward path tracing from the middle point to the end point and the reverse path tracing from the middle point to the start point are executed, thus eliminating the need to trace many paths which do not pass the middle point and thereby reducing wasteful tracing. According to the prior art shown in FIG. 11, as the tracing depth becomes deeper, the number of branches to be traced increases. By way of contrast, according to this invention, since the tracing is executed in the forward and reverse directions with the middle point M as the center, the tracing depth is shallower than the one involved in the prior art, as shown in FIG. 10, and the required range for the tracing is also reduced.

This invention will be better understood with reference to the following detailed description taken in conjunction with the accompanying drawings.

BRIEF DESCRIPTION OF THE DRAWINGS

FIG. 2 is a flowchart for a process done by a main control section of the apparatus;

FIG. 4 is a flowchart for a process done by a reverse trace section of the apparatus;

FIG. 6 is a diagram illustrating coupling data of the logic circuit stored in the storage section;

FIG. 9 is a block diagram of a logic circuit path apparatus according to another embodiment of this invention;

FIG. 10 is a diagram for explaining the tracing range according to this invention.

DETAILED DESCRIPTION OF THE PREFERRED EMBODIMENTS

Figure 1:
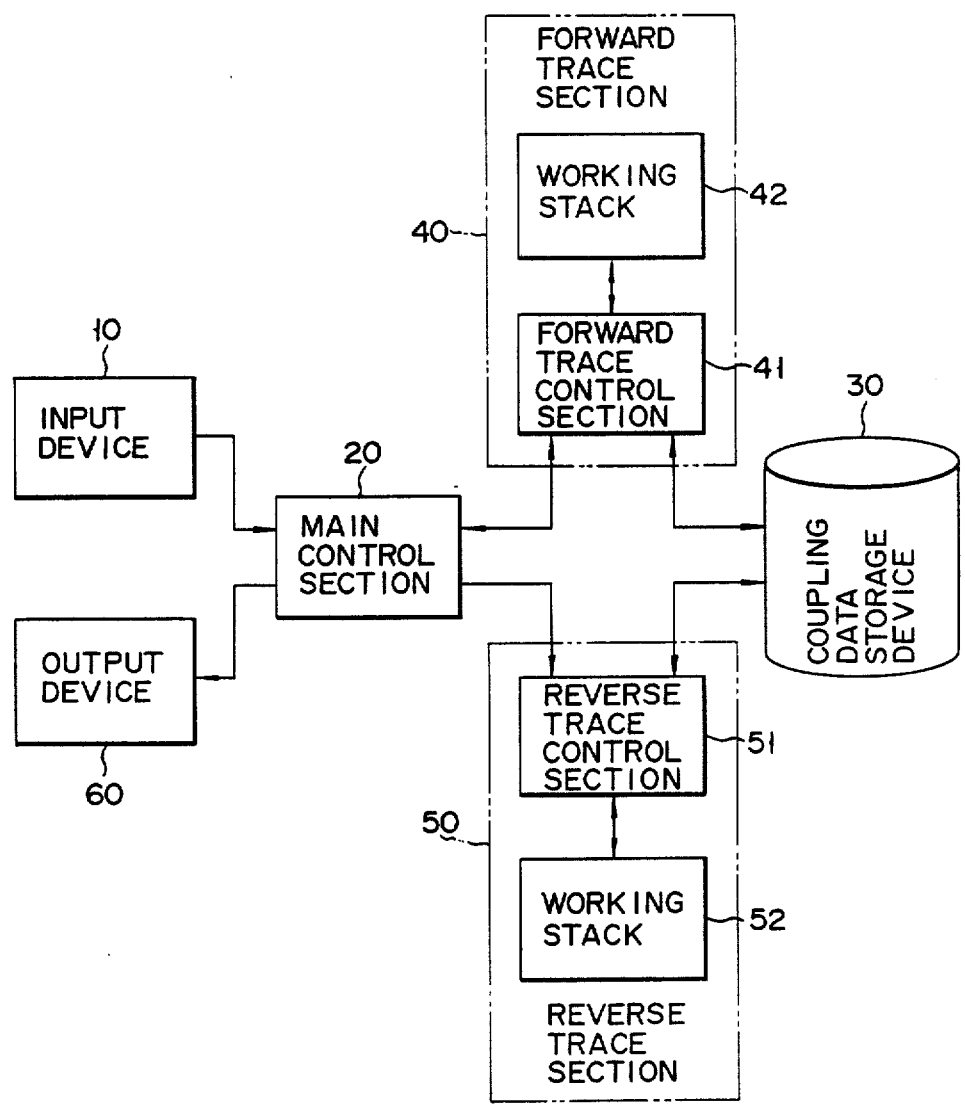
FIG. 1 is a block diagram of a logic circuit trace apparatus according to one embodiment of this invention.

FIG. 1 is a block diagram illustrating the arrangement of a logic circuit trace apparatus according to one embodiment of this invention. This apparatus comprises an input device 10 for specifying a path to be traced, a main control section 20 driven by an instruction entered through this input device 10, coupling data storage device 30 for storing data which represents the coupling relationship between the individual elements constituting a logic circuit, a forward trace section 40 and a reverse trace section 50, which are controlled by main control section 20 and perform a tracing operation based on the coupling data stored in coupling data storage device 30, and an output device 60 which under the control of main control section 20 displays a path traced by both trace sections 40 and 50.

FIG. 2 illustrates the flow of the process performed by main control section 20. A path which a user wants to trace is specified by the user entering start, middle and end points through input device 10 (step S1). These points may be specified by element numbers. As another example, the individual points may be specified by specific terminal numbers of elements. Main control section 20 sends a trace request to forward trace section 40 to trace a forward path extending from the middle point to the end point which are entered through input device 10 (step S2) and waits for a response (step S3). There are various ways of sending the request, with the correct one being properly selected in accordance with application. Case examples include, for instance, a trace request for a single one of a plurality of paths passing the specified points or a trace request for all the paths passing specified point. Forward trace section 40 checks the coupling data stored in storage section 30 in response to the trace request and traces a path which extends from the middle point to the end point in the forward direction toward an output side. When such a path is found, forward trace section 40 returns data of the path to main control section 20. If such a path does not exist, trace section 40 returns the event to main control section 20. Upon receipt of data indicating the presence of the path (step S4), main control section 20 sends a trace request to reverse trace section 50 to trace a reverse path extending from the middle point to the start point (step S5) and waits for a response (step S6). On the other hand, when receiving data that indicates the absence of a path extending from the middle point to the end point, main control section 20 understands that the specified path does not exist at this time and outputs the event (step S9), thus completing the process. Reverse trace section 50 checks the coupling data stored in storage section 30 in response to the trace request and traces a path which extends from the middle point to the start point in the reverse direction toward an input side. When such a path is found, reverse trace section 50 returns the data of this path to main control section 20. If such a path does not exist, trace section 50 returns the event to main control section 20. If the path extending from the middle point to the start point is found (step S7), main control section 20 outputs the data of the path together with the data of the path extending from the middle point to the end point (step S8), thus completing the process. On the other hand, upon receipt of data indicating absence of the path extending from the middle point to the start point, main control section 20 outputs data indicating that the specified path does not exist (step S9), thus completing the process. The forward and reverse tracing is not limited to the above manner, but may be performed in the reverse order or simultaneously.

Figure 3:
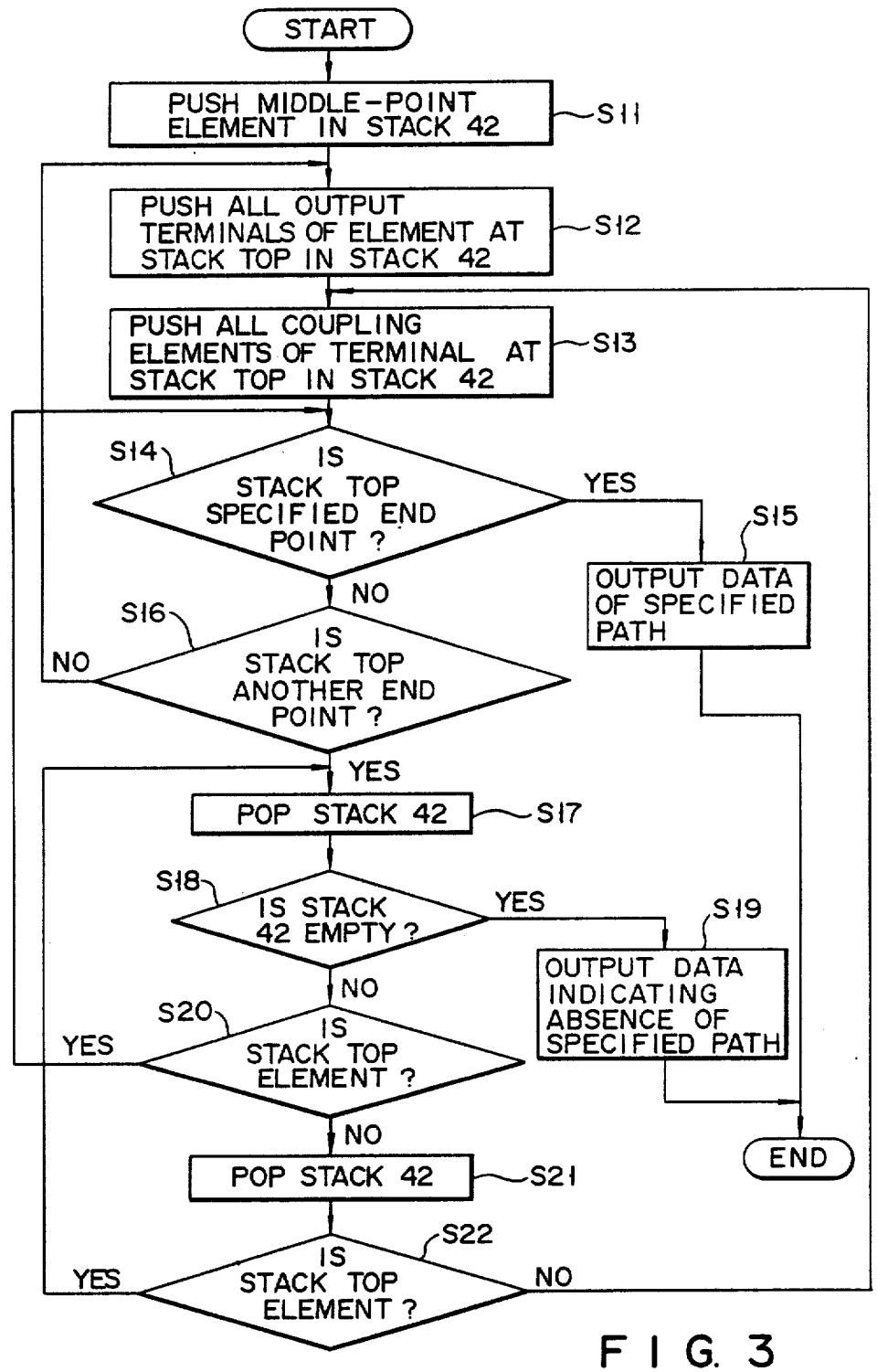
FIG. 3 is a flowchart for a process done by a forward trace section of the apparatus.

As shown in FIG. 1, forward trace section 40 comprises a forward trace control section 41 and a first working stack 42. The flow of the tracing process of forward trace control section 41 is illustrated in FIG. 3. First, element data at the middle point specified by main control section 20 is pushed (step S11). Control section 41 checks the data stored in coupling data storage device 30 and sequentially pushes data of all the output terminals of the element at the top of stack 42 (step S12). Then, control section 41 extracts data of destination elements of the output terminal stored at the top of stack 42 and pushes them in stack 42 (step S13). As a consequence, the coupling is traced in one stage toward the output side. Then, it is determined whether or not the element data stored at the top of stack 42 is the specified end point (step S14). If it is the specified end point, it means that the specified path has been found, so that the data of the specified path stacked in stack 42 is outputted (step S15). The data of the specified path can be generated by alternately extracting the element data and the output terminal data in sequence from the bottom of stack 42. If there is a plurality of sequential element data or a plurality of sequential output terminal data, the data is stacked at the respective tops is extracted. On the other hand, if the element data at the top of stack 42 is not the specified end point, it is determined whether or not this element is located at another end point (step S16). The "another end point" indicates one from which the coupling cannot be further traced toward the output side, or from which the tracing toward the output side has no significance. An example of the former case is an external output terminal of the circuit, and an example of the latter case is a flip-flop element in the application where a propagation delay time between flip-flops is attained. When it is determined that the element data at the top of stack 42 is not another end point, the flow returns to step S12 to further trace the coupling. On the other hand, when it is determined that the element data at the top of stack 42 is another end point, this element data is abandoned by popping stack 42 (step S17). When stack 42 is popped, it is determined whether or not the stack 42 is empty (step S18). If it is empty, it means that there is no specified path present and such is outputted (step S19), thus completing the process. If stack 42 is not empty, it means that there is some other path to be traced. Accordingly, it is determined whether the data at the top of stack 42 is an element or an output terminal (step S20). If it is the former, the flow returns to step S14 to continue the tracing, and if it is the latter, it means that all the coupling destinations of the output terminal have been checked, so that the data of the output terminal is abandoned by popping stack 42 (step S21). In this case, it is again determined whether the data at the top of stack 42 is an element or an output terminal (step S22). If it is the former, it means that the coupling destinations with respect to all the output terminals of that element have been checked, so that the element data is abandoned by popping stack 42 (step S17). If it is the latter, the flow returns to step S13 to carry out the tracing of the coupling destinations of the output terminal. In this manner, forward trace control section 41 traces a path extending from the middle point to the end point, using working stack 42.

As shown in FIG. 1, reverse trace section 50 comprises a reverse trace control section 51 and a second working stack 52. The flow of the tracing process of reverse trace control section 51 is illustrated in FIG. 4. The basic operational principle here is the same a that of the aforementioned forward trace section 40, but the difference is that reverse trace control section 51 pushes element data and input terminal data of the individual elements in working stack 52 due to its reverse tracing of a path from the middle point toward the input side. In step S36, it is determined whether element data defines another start point; the "another start point" indicates the one from which the coupling cannot be further traced toward the input side, or from which the tracing toward the input side has no significance. An example of the former case is an external input terminal of the circuit, and an example of the latter case is a flip-flop element in the application where a propagation delay time between flip-flops is attained.

Figure 5:
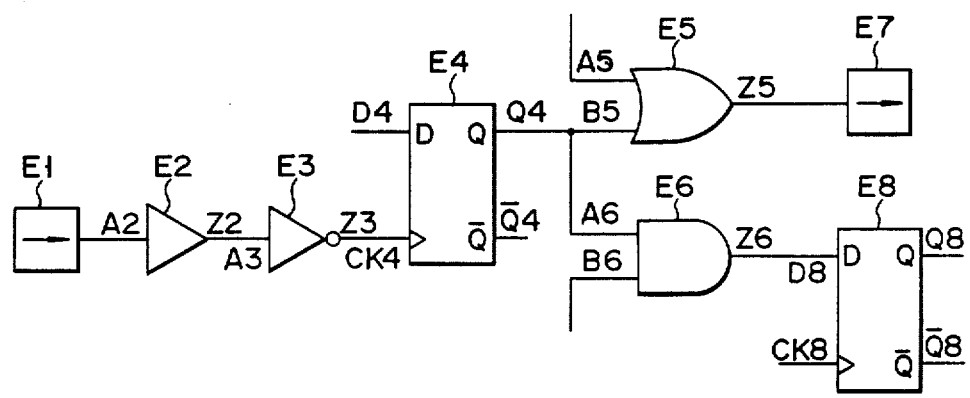
FIG. 5 is a block diagram illustrating a logic circuit which is a tracing target as stored in a coded form in a coupling data storage section of the apparatus.

FIG. 5 illustrates an example of a logic circuit as a tracing target. In this case, coupling data storage device 30 stores coupling data as shown in FIG. 6. In this circuit, trace a signal path extending, for example, from an external input terminal E1 to a flip-flop E8 passing through a flip-flop E4, the present apparatus functions as follows.

First, main control section 20 makes a request to forward trace section 40 to trace a signal path extending from the middle point E4 to the end point E8 based on specifying data that specifies the elements E1 (start point), E4 (middle point) and E8 (end point) entered through input device 10.

In response to the request, forward trace control section 41 of forward trace section 40 pushes data of element E4 at the middle point in stack 42 in step S11 of the aforementioned flowchart of FIG. 3. Then, control section 41 sequentially pushes data of output terminals Q4 and Q4 of element E4 in stack 42. In the subsequent step S13, data of the coupling destination elements E6 and E5 of output terminal Q4 whose data is at the top of stack 42 are sequentially pushed in the stack 42. As element E5 at the stack top is neither the specified end point (E8) nor another end point, the flow returns to step S12 to push data of an output terminal Z5 in stack 42; and the data of the coupling destination E7 is pushed therein in step S13. The data stored in stack 42 at this stage is as shown in FIG. 7A. Since element E7 is not the specified end point but another end point, stack 42 is popped in step S17, making output terminal Z5 the stack top. As it is not an element, stack 42 is popped again in step S21. As a result, element E5 becomes the stack top so that the flow returns to step S17 to pop this element E5. Consequently, the stack top becomes element E6, so that the flow returns to step S14. The data stored in stack 42 at this stage is as shown in FIG. 7B. As the stack top in this case is neither the specified end point nor another end point, the flow returns to step S12 to push an output element Z6; the coupling destination element E8 is pushed in stack 42 in step S13. The data stored in stack 42 at this stage is as shown in FIG. 7C. Since the stack top is the specified end point E8, in step S15 forward trace control section 41 outputs data that indicates the presence of the specified path, which completes the process.

In response to the data, the main control section makes a request to reverse trace section 59 to trace a signal path extending from the middle point E4 to the start point E1 in the reverse direction.

Figures 7, 8:
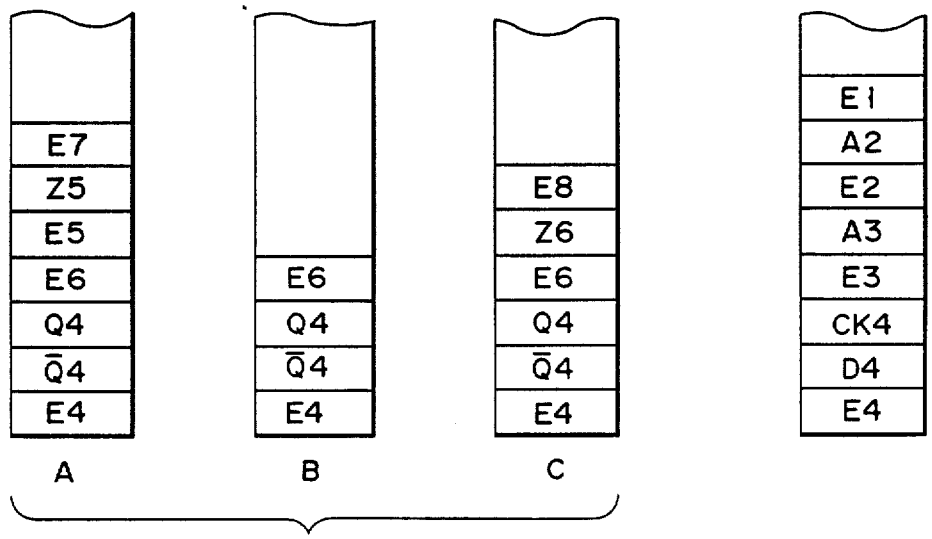
FIG. 7 is a diagram illustrating the content of a first working stack at the time of a forward trace done by the apparatus.
FIG. 8 is a diagram illustrating the content of a second working stack at the time of a reverse trace done by the apparatus.
Figure 11:
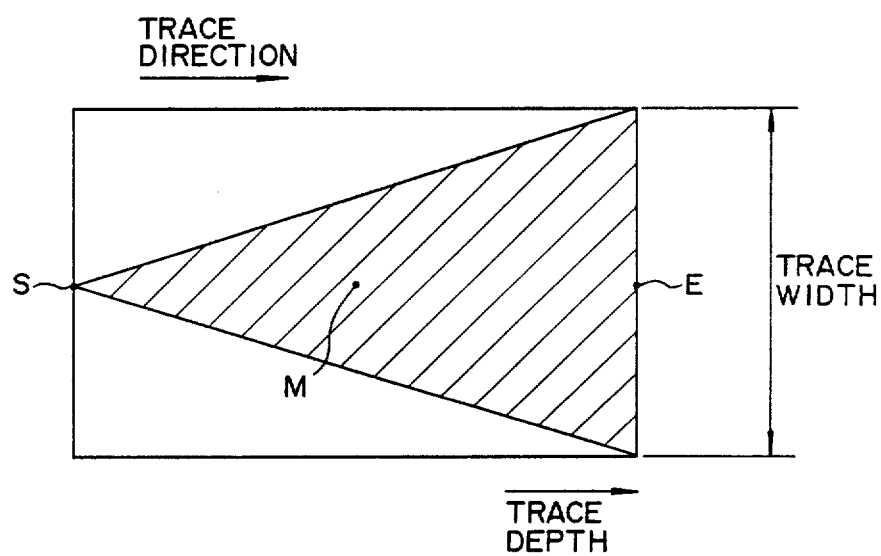
FIG. 11 is a diagram for explaining the tracing range according to the prior art.

In response to the request, reverse trace control section 51 of reverse trace section 50 sequentially pushes in stack 52 the middle point E4, data of its input terminals D4 and CK4, data of its coupling destination element E3, data of an input terminal A3 and a coupling destination element E2 of terminal A3, and an input terminal A2 and a coupling destination element E1 of terminal A2. The content of stack 52 at this stage is as shown in FIG. 8. As the stack top is the specified start point, data indicating that the specified path has been found is outputted, thus completing the process. In this case, input terminals D4 and CK4 of a flip-flop E4 are treated equally; however, in the application where a clock signal is a target for the tracing, if terminal CK4 is known in advance to be a clock terminal, data of terminal D4 need not be pushed in stack 52, thus ensuring a higher processing speed.

When the path starting at the specified start point E1, passing the middle point E4, and ending at the end point E8 is found, main control section 20 outputs its data to output device 60, which in turn presents the data to the user. This complete the overall process.

As described above, in tracing a signal path from an external clock input terminal through one flip-flop to another flip-flop, the range of signal paths from the external clock input terminal is extremely broadened in general, so that it would be wasteful to start tracing from the input terminal as per the prior art. In contrast, there is often only one path extending from a flip-flop to the external clock input terminal. According to this invention, therefore, no wasteful tracing between the start point and the clock input terminal of a middle point is performed, thus significantly improving the tracing efficiency.

The present invention is in no way limited to the above particular embodiment. In the embodiment, forward and reverse trace sections 40 and 50 are controlled by main control section 20; however, these may be provided in the same control means. For instance, the path trace apparatus as shown in FIG. 9 is provided with a path trace section 70 comprising a bi-directional trace control section and first and second working stacks 72 and 73. As its name implies, the bi-directional trace control section 71 executes both the forward tracing of a path extending from the specified middle point to the specified end point and the reverse tracing of a path from the middle point to the specified start point. The functions of stacks 72 and 73 in this case are the same as those shown in FIG. 1. These stacks 72 and 73 may be replaced by a single common stack.

There may be a further embodiment, which carries out the path tracing with a higher priority given to the width direction than the depth direction. The tracing in the depth direction is, as mentioned earlier, simpler, whereas the tracing in the width direction is suitable for finding the shortest signal path. Needless to say, this invention is applicable not only to the path tracing in a logic circuit, but also to the path tracing in a different network such as one involving a map or process diagram.

What is claimed is:

1. A path trace apparatus comprising:
    coupling data storage means for storing data representing a coupling relationship between elements constituting a network;
    input means for inputting data specifying start, middle and end elements of a path to be traced;
    forward trace means for inspecting said data representing said coupling relationship between said middle and end elements in said network to trace the path coupling said middle and end elements in a forward direction in said network, said forward direction being defined as a direction from said middle elements toward said end element;
    reverse trace means for inspecting said data representing said coupling relationship between said middle and start elements in said network to trace the path coupling said middle and start elements in a reverse direction in said network, said reverse direction being defined as a direction from said middle element toward said start element;
    main control means for controlling said forward trace means and said reverse trace means in such a way as to cause said forward trace means to trace the path coupling said middle and end elements, and to cause said reverse trace means to trace the path coupling said middle and start elements; and
    output means for outputting an information representing that said path between said start and end elements is coupled under the control of said main control means.

2. The path trace apparatus according to claim 1, wherein said forward trace means comprises a forward trace control section and a first working stack, and said forward trace control section traces a path by performing storage/abandonment of data of said constituent elements of said network to and from said first working stack based on data stored in said coupling data storage means.

3. The path trace apparatus according to claim 1, wherein said reverse trace means comprises a reverse trace control section and a second working stack, and said reverse trace control section traces a path by performing storage/abandonment of data of said constituent elements of said network to and from said second working stack based on data stored in said coupling data storage means.

4. The path trace apparatus according to claim 1, wherein said coupling data storage means stores data representing a coupling relation between elements constituting a logic circuit.

5. A path trace apparatus comprising:
    coupling data storage means for storing data representing a coupling relationship between elements constituting a network;
    input means for inputting data specifying start, middle and end elements of a path to be traced;
    path trace means for inspecting said data representing said coupling relationship between said middle and end elements in said network to trace the path on the network coupling said specified middle and end elements in a direction from said middle element toward said end element, and for inspecting said data representing said coupling relationship between said middle and start elements in said network to trace the path on said network coupling said specified middle and start elements in a direction from said middle element toward said start element; and
    output means for outputting an information representing that said path between said start and end elements is coupled under the control of said path trace means.

6. The path trace apparatus according to claim 5, wherein said path trace means comprises a bi-directional trace control section and first and second working stacks, and said bi-directional trace control section traces a path by performing storage/abandonment of data of said constituent elements of said network to and from said first and second working stacks, based on data stored in said coupling data storage means.

7. The path trace apparatus according to claim 5, wherein said coupling data storage means stores data representing a coupling relationship between elements constituting a logic circuit.

8. A path trace method for tracing a path having specified start, middle and end elements in a network based on data representing a coupling relationship between constituent elements of said network, said method comprising the steps of:
    inputting data specifying start, middle and end elements of the path to be traced;
    forward tracing the path in said network coupling specified middle and end elements from said middle element toward said end element;
    reverse tracing the path in said network coupling specified middle and start elements from said middle element toward said start element; and
    outputting an information representing that said path between said start and end elements is coupled by said forward and reverse tracing steps.

* * * * *